United States Patent

[11] 3,596,544

[72] Inventor Malcolm H. Pitman
　　　　　Scotia, N.Y.
[21] Appl. No. 803,203
[22] Filed Feb. 28, 1969
[45] Patented Aug. 3, 1971
[73] Assignee General Electric Company

[54] MACHINE TOOL CUTTING INDICATION AND CONTROL
7 Claims, 1 Drawing Fig.
[52] U.S. Cl. .................................................. 82/1 R,
　　　　　　　　　　　　　　　　　　　　77/32.7, 340/267 R
[51] Int. Cl. .................................................. B23b 3/06
[50] Field of Search ..................................... 82/1, 2;
　　　　　　　　　　　　　　　　　　　　77/1, 32.7, 32.4

[56] References Cited
UNITED STATES PATENTS
2,600,453　6/1952　Weingart ..................... 82/1

Primary Examiner—Francis S. Husar
Attorneys—Paul A. Frank, John F. Adhern, Julius J. Zaskalicky, Frank L. Neuhauser, Oscar B. Waddell and Joseph B. Forman ABSTRACT: Circuit means are provided for sensing the no load power into an electrical motor for driving machine tool and storing an electrical signal representative thereof. Power input in response to loading of said motor is also sensed. Circuit means are provided responsive to the difference in the no load and load power signals to provide a resultant signal varying in accordance with the magnitude of the difference. The existence of the signal indicates contact of the cutting tool with the workpiece and the magnitude of such signal indicates the degree of engagement.

PATENTED AUG 3 1971
3,596,544
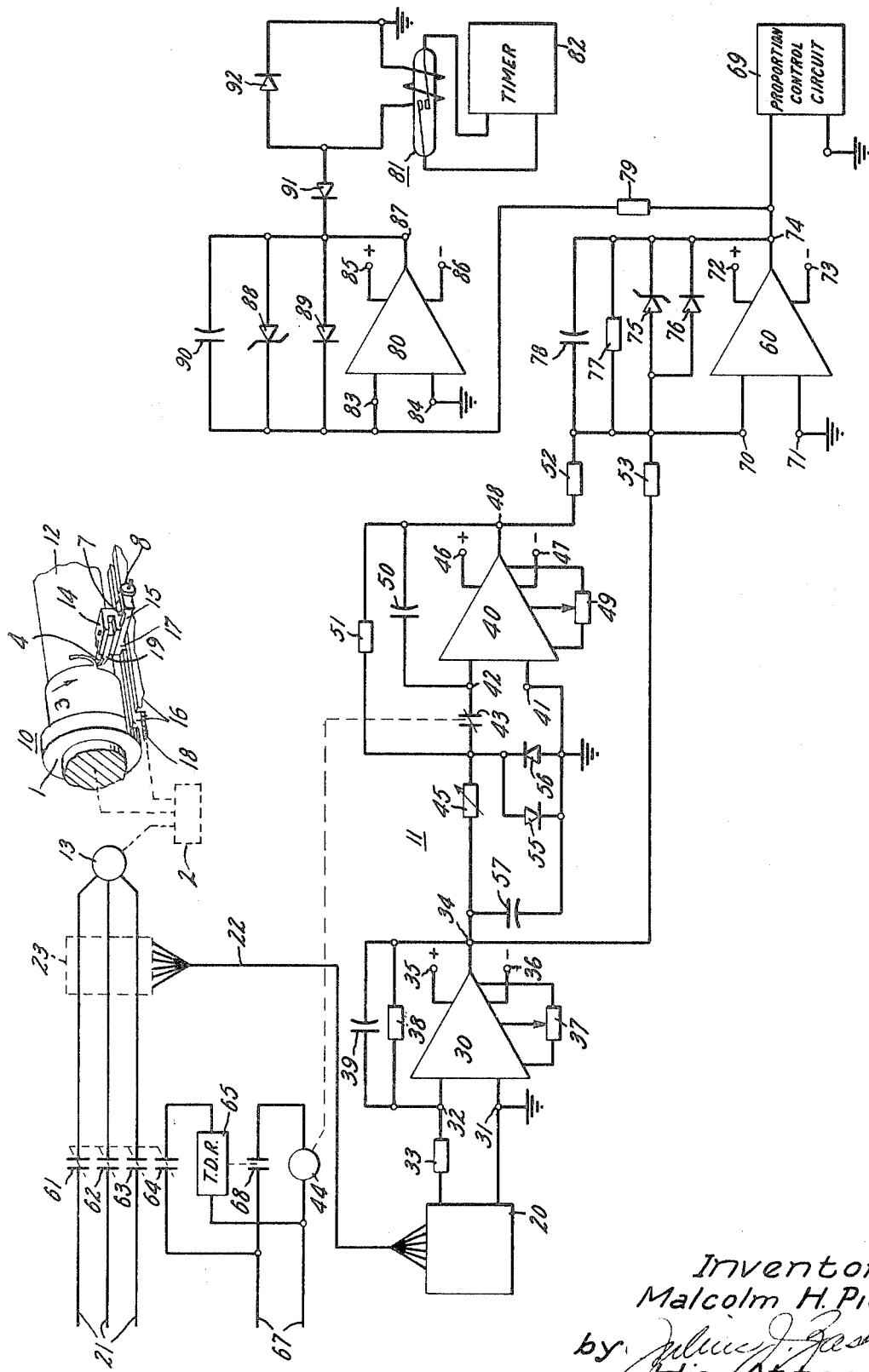
Inventor:
Malcolm H. Pitman,
by Julius J. Zaskalicky
His Attorney.

MACHINE TOOL CUTTING INDICATION AND CONTROL

MACHINE TOOL CUTTING INDICATION AND CONTROL

The present invention relates to apparatus for use with machine tools for sensing cutting action, and the degree thereof, of a cutting tool thereon.

The high cost of modern machine tools such as lathes, milling machines, planars and the like, particularly when automatically controlled, has created a need for equipment which will log the time that such machines are performing a machining operation. It has been found that the utilization of some such machines is not high enough to yield an adequate return on the investment they represent. To improve utilization of such machine tools certain information is required that is best gathered by automatic data logging equipment. Conventional recorders will log the time that the spindle of a machine tool to which the workpiece is attached is turning but such time may be and usually is quite different from the actual cutting or machining time of the machine tool.

Accordingly, an object of the present invention is to provide a simple, effective and highly reliable apparatus for providing automatically an indication of time that a machine tool is performing a machining operation.

Another object of the invention is to provide a versatile machine tool cutting indication apparatus which may be attached to most any kind of a machine tool.

Another object is to provide apparatus of the character described which is highly sensitive in response to the performance of machining operations on a machine tool.

In automatically operated machine tools it is desirable in order to save time to rapidly advance cutting tools toward engagement with a workpiece and thereafter provide the desired rate of advance thereof into the workpiece.

A further object of the present invention is to provide apparatus which produces signals which may be used not only to terminate a rapid advance of a cutting tool into a workpiece before appreciable penetration has been made, but also to provide the proper rate of advance of the cutting tool into the workpiece to achieve efficient machining of the workpiece.

In accordance with an illustrative embodiment of the present invention as applied to a machine tool there is provided means for sensing the no-load power into an electrical motor for driving the machine tool and storing an electrical signal representative thereof. Power input in response to loading of said motor is also sensed. Circuit means are provided responsive to the difference in the no-load and load power signals to provide a resultant signal varying in accordance with the magnitude of said difference. The existence of the signal indicates contact of the cutting tool with the workpiece and the magnitude of such signal indicates the degree of engagement.

The novel features which are believed to be characteristic of the present invention are set forth in the appended claims. The invention itself, however, together with further objects and advantages thereof may best be understood by reference to the following description taken in connection with the accompanying drawings wherein:

The FIGURE shows a perspective view of a workpiece being machined by a cutting tool mounted on a toolholder assembly and a block diagram partly in schematic form indicating control apparatus of the present invention.

Referring now to the FIGURE, there is shown portions of a machine tool 10 and apparatus 11 for providing a signal responsive to the loading of an electric motor driving the machine tool. A metallic workpiece 12 is supported in a workpiece holder 1. The workpiece holder is mechanically coupled through a gear drive 2 to drive motor 13 which drives the workpiece 12 in the direction indicated by the arrow 3. A cutting tool 4 is also shown mounted in a toolholder assembly 15. The toolholder assembly 15 includes a toolholder post 14 and a toolholder bed 17 which is mounted on a pair of parallel guideways 16 parallel to the axis of rotation of the workpiece. The toolholder bed is movable along the guideways 16 by means of a screw drive 18 engaging the bed 17 at one end thereof and driven at the other end thereof from the gear drive 2. The cutting tool 4 is mounted to the front end of a toolholder 19 which in turn is clamped to a toolholder post 14. The toolholder post 14 is slidably mounted on a pair of grooves in the bed 17 which is perpendicular to the guideways 16. A screw member 7 is provided, one end of which engages the post 14 and the other end of which engages the upright side portion of the bed 17 and includes a knob 8 for turning the screw member for effecting engagement and disengagement of the cutting tool 4 with the workpiece 12. The means described above and shown in the drawings for rotating the workpiece and driving the cutting tool are conventional.

The apparatus 11 includes a power transducer 20 for providing the DC output representative of power input from the AC power lines 21. Such a device may be a Hall effect semiconductor device in which the inputs, corresponding to current and voltage in a transmission line, produce an output which is proportional to the product of the component of the current in phase with the voltage of the AC power line 21. In this FIGURE the power transducer 20 is a three-phase wattmeter transducer and may be, for example, a PT series manufactured by the F.W. Bell Company, Inc. of Columbus, Ohio. The cable 22 from the input terminals of the transducer connects to the three-phase power input lines 21 by means of a coupling unit 23 which may include current transformers and direct connections to the lines 21 to provide voltage signals. The output of the transducer 20 is applied to the input of a wide band differential amplifier 30 having a high input impedance and may be Basic Model No. 3064 General Purpose Operational Amplifiers manufactured by the Burr Brown Research Corporation of Tuscon, Ariz. Amplifier has a pair of input terminals 31 and 32, terminal 31 of which is connected to the ground or common terminal of the power supply for the amplifier and terminal 32 is connected to the output of the wattmeter through a resistance 33. Output from the amplifier 30 is provided between output terminal 34 and ground. Terminal 35 is connected to the positive terminal of a unidirectional source, hereinafter referred to as B+, and terminal 36 is connected to the negative terminal of a unidirectional source, hereinafter referred to as B−. The other terminals of said sources are connected to ground. A balancing potentiometer 37 is provided for balancing the input and output signals of the amplifier, that is, to provide zero output in relation to ground for a predetermined output to the amplifier 30. A resistance 38 is connected between the output terminal 34 and the ungrounded input terminal 32. The ratio of the resistance 38 to the input resistance 33 determines the amplification or gain of the amplifier 30. A capacitor 39 is provided in shunt with the resistance 38 to bypass noise.

The output of the amplifier 30 is applied to another broad band differential amplifier 40 which also may be a Basic Model No. 3064 made by the Burr Brown Research Corporation of Tuscon, Ariz. The amplifier 40 includes a pair of input terminals 41 and 42, terminal 41 of which is connected to ground, and terminal 42 of which is connected through a normally closed contacts 43 of a relay 44 to one terminal of a variable resistance 45, the other terminal of which is connected to the output terminal 34 of the amplifier 30. Terminal 46 is connected to B+ and terminal 47 is connected to B−. Output is obtained between output terminal 48 and ground. A balancing potentiometer 49 is connected to the amplifier 40 to provide balance between the input and output to the amplifier 40. The potentiometer 49 is adjusted to provide a zero output in relation to ground for a predetermined input to the amplifier. A large capacitor 50 in this particular example a 2-microfarad capacitor, of the polystyrene type having low internal leakage is connected between the output terminal 48 and the ungrounded input terminal 42. The leakage resistance of such capacitor is of the order of $10^{11}$ ohms. Also, as the input impedance of the amplifier 40 is of the order of 10¹¹ ohms, the combination of the capacitor 50 and the discharge resistances associated with the capacitor provide a very long time constant of the order of 2 percent loss in voltage in 4 hours. The reason for such a large time constant will be apparent from the description below. A resistance 51 is connected between the output terminal 48 and the contact of the normally closed contacts 43 remote from the input terminal 42 of the amplifier 40. The ratio of the resistance 51 to the variable resistance 45 determines the gain of the amplifier 40. The gain of the amplifier 40 is set to be slightly greater than unity. The gain of the amplifier determines the threshold level of power input to the motor 13 above no-load power input at which a signal is obtained from a subtractive network represented by resistors 52 and 53 to provide output to a driver amplifier 60 for operation of a utilization circuit such as a meter or a proportion control circuit 69 giving a linear output above no load. A pair of diodes 55 and 56 are provided connected in parallel and reversely poled between junction of resistances 45 and 51 and ground for the purpose of limiting the excursion of signal applied to the input of the amplifier 40 between voltages represented by the forward drops of the diodes or a plurality of such diodes connected in series to give a greater range for such excursions. A capacitor 57 is provided in shunt between the output terminal 34 of the amplifier 30 and ground to filter noise from the output signal.

Signals from the output of amplifier 30 are directed into two channels to the input of amplifier 60. One channel includes variable resistance 45, the normally closed contact 43, the amplifier 40 and the resistance 52. The voltage reference amplifier 40 reverses the polarity of the signal applied to the input thereof. Accordingly, resistances 52 and 53 form a subtractive network for developing an output between the input to amplifier 60 and ground representing the difference of the signals applied at the other ends thereof and ground.

To operate the machine tool the ganged contacts 61, 62, 63 are closed to energize the motor 13. Simultaneously with the closing of the contacts 61, 62, 63 a fourth contact 64 ganged therewith is closed and energizes a time delay relay 65 connected to power lines 67. The time delay 65 relay in turn closes normally open contact 68, after a predetermined time period, for example a few seconds, connected in series with the coil of the relay 44 to the power line 67. Energization of the relay 44 opens the normally closed contact 43. Immediately upon closing of ganged contacts 61, 62, and 63 in the power lines 21, power flow into the motor 13 is sensed by the transducer 20 and provides a signal to the reference amplifier 40. After a few seconds after transients have subsided the voltage appearing at the output of the amplifier 40 and stored thereon by the long time constant of the discharge circuit of capacitor 50 is a representative of the no-load power being supplied to the motor. The voltage is of positive polarity in relation to ground and is slightly greater than the voltage appearing at the output of the amplifier 30. Should the cutting tool be advanced into the workpiece to perform a machining operation thereon, the power required to be supplied from the power lines to the motor increases. Such increase in power appears as an increase in voltage across the output terminals of the transducer 20. Such voltage is amplified by the amplifier 30 and appears as a negative signal in relation to ground at the output thereof. The signal is blocked from passing to the reference amplifier 40 by the contacts 43 which are now open. Such signal, however, appears across resistance 53 and combines with the output from the reference amplifier 40 appearing across resistance 52 and ground. Accordingly, the net signal appearing across the terminal 70 at the input of amplifier 60 and ground is the difference between the two signals stored, no load signal and the load signal. Should the power input to the motor exceed the threshold level set by the gain of the amplifier 40, a net signal appears at the input of the amplifier 60. Such net signal is amplified by amplifier 60 to provide an indication of degree engagement of the machine tool with a workpiece. Such signal can be further amplified by amplifier 80 to provide a driving signal to effect closure of the contacts of a reed relay 81 which in turn can initiate operation of timer 82.

The amplifier 60 may supply a signal proportional to the amount of loading the machine tool produces on the workpiece. Such a signal could be used for setting the level of optimum cutting load on the machine tool 10. Each of the output amplifiers 60 and 80 may be Basic Model No. 3119 amplifiers made by Burr Brown Research Corporation of Tuscon, Ariz. The amplifier 60 includes a pair of input terminals 70 and 71 one of which is connected to ground and the other of which, namely 70, is connected to the junction of resistances 52 and 53. B+ and B— lines are connected respectively to terminals 72 and 73. Output is taken between output terminal 74 and ground. A Zener diode 75 is connected in shunt across the input terminal 70 and the output terminal 74 to provide a limit to the positive excursion of the output thereof for protection of instruments connected between output 74 and ground and, similarly, a clamping diode 76 may be connected across the input and output terminal 70 and 74 to limit the excursion of the output voltage in the negative direction to the value of the forward drop in diode 76. Gain of the amplifier 60 is controlled by the ratio of the resistance 77, connected between the input terminal 70 and output terminal, and the input resistances 52 and 53. A shunting capacitor 78 to filter noise may be provided.

The output of the amplifier 60 is applied through resistance 79 to the input terminal 83 of amplifier 80, the other input terminal 84 of which is connected to ground. B+ and B— lines are connected respectively to terminals 85 and 86. Output is taken between the output terminal 87 and ground. A Zener diode 88 is connected between the input and the output terminals 83 and 87 to limit the negative excursion of the output voltage and similarly a diode 89 is connected in shunt between the input and the output terminals 83 and 87 to limit the excursion of the output in the positive direction to a value less than the forward drop of the diode 89. A capacitor 90 to bypass noise is provided in shunt between the input and output terminals 83 and 87. The output from amplifier 80 is applied through a diode 91 to one terminal of the solenoid of a reed relay 82, the other terminal of which is connected to ground. A diode 92 is shunted with a solenoid of the reed relay 81 to dampen any switching transients produced in the opening of the solenoid circuit of the relay. The contacts of the reed relay 81 are connected to a utilization which may be a timer 82 as shown.

The apparatus described is particularly applicable to systems using induction motors. The excitation or no-load current of such induction motors is substantially in phase quadrature with the driving voltage. As the loading increases, the resultant input current changes in phase without appreciably changing in amplitude. However, the power factor of the input changes at a very rapid rate for increase in load until loading of the induction motor approaches a substantial percentage of the full load rating. Accordingly, apparatus which is responsive to current in the power input lines of the induction motor would not be sufficiently sensitive to provide a good source of timing signal to indicate loading thereon. It should be noted that in most machine tools the loading of the motor normally does not exceed a fraction of the rated output of the motor. In machine tools using induction motors I have found that satisfactory operation is obtained with the gain of the amplifier 40 set to provide an output which is 2 percent greater than the input. Accordingly, when the loading of the motor 13 exceeds 2 percent of the no-load power input to the motor, a signal is developed at the input terminals of the amplifier 60. The gain of the amplifier 80 can be set to be quite high and hence responds substantially instantaneously to a small signal at the input of amplifier 60 once the load current exceeds the threshold. Of course, the threshold would be set to satisfy the requirements of the application to which the apparatus is put.

While the apparatus has been described in connection with an AC motor, it is equally applicable to drive systems in which DC motors are utilized. Also, as the loading on the motor 13 changes, the output of the amplifier 60 varies in accordance therewith. Such output is applied to the proportion control circuit. The proportion control circuit may include a source of reference voltage of variable magnitude corresponding to various degrees of cutting loading of the machine tool. The departure of the voltage derived from the output of the amplifier 60 from the aforementioned reference voltage, could be used as an error signal for a servomechanism to provide a proper engagement of the machine tool with the workpiece for efficient and effective cutting action.

While the invention has been described in a specific embodiment, it will be appreciated that many modifications may be made by those skilled in the art and I intend by the appended claims to cover all such modifications and changes as fall within the true spirit and scope of the invention.

What I claim as new and desire to secure by Letters Patent of the United States is:

1. In combination with a machine tool which includes a workpiece holder and a cutting tool, an electric motor for moving the workpiece holder in relation to the cutting tool, and means for advancing the workpiece holder in relation to the cutting tool to bring a workpiece attached to the workpiece holder into engagement with the cutting tool for performing a machining operation on the workpiece, apparatus for providing an indication of engagement of the tool with the workpiece comprising
    a first signal means connected to said electrical motor for sensing the no-load power input to said electrical motor and deriving a first unidirectional electrical signal the amplitude of which corresponds to said no-load power input,
    a storage means connected to said first signal means for storing said first unidirectional signal,
    a second signal means connected to said storage means for sensing the power input to said electrical motor in response to loading of said motor and for providing a second unidirectional signal, the amplitude of which varies with and corresponds to the loading of said motor, no-load
    means connected to said storage means and to said second signal means for combining said stored first unidirectional signal and said second unidirectional electrical signal to develop a third unidirectional signal the amplitude of which varies in accordance with the amplitude of the difference of said first and second electrical signals corresponding to the difference in said no-load and load power input respectively to said motor, whereby an indication of the engagement of said tool with said workpiece is obtained.

2. The combination of claim 1 including means connected to said combining means responsive to a predetermined level of said third signal corresponding to a predetermined loading of said motor by the engagement of said tool with said workpiece to provide an indication of the engagement of said tool with said workpiece.

3. The combination of claim 1 in which the factor of proportionality in said first signal means between no-load power input to the amplitude of said first unidirectional signal is greater than the factor of proportionality in said second signal means between the load power input to the amplitude of second unidirectional signal, whereby zero amplitude of said third unidirectional signal corresponds to a threshold level of loading of said motor, said threshold level being determined by the difference in said factors of proportionality.

4. The combination of claim 2 in which said means responsive to said third unidirectional signal is a timer.

5. In combination with a machine tool which includes a workpiece holder and a cutting tool, an electric motor for rotating the workpiece holder in relation to the cutting tool, and means for advancing the workpiece holder in relation to the cutting tool to bring a workpiece attached to the workpiece holder into engagement with the cutting tool for performing a machining operation on the workpiece, apparatus for providing an indication of engagement of the tool with the workpiece comprising
    means connected to a source of electrical energy for electrically energizing said motor,
    means coupled to the input circuit of said electric motor for sensing power flowing thereto and providing a first unidirectional signal corresponding to the power flowing to said motor,
    a pair of channels, each having an input circuit and an output circuit,
    means for applying said first unidirectional signal to the input circuits of said channels,
    one of said channels including an amplifier for developing a second unidirectional signal in response to said first unidirectional being applied thereto and being capable of providing said second unidirectional signal at the output thereof for a long period of time when said first predetermined input is no longer being applied thereto,
    means connected to the input circuit of said one channel for disconnecting the input circuit of said one channel a short time after the energization of said motor and before loading is applied thereto whereby said first signal is applied solely to the input circuit of said other channel,
    said other channel providing a third electrical signal at the output thereof in response to said first electrical signal, the amplitude of which varies with and corresponds to the loading of said motor,
    means connected to the output circuits of said channels for differentially combining the outputs of said channels and for deriving a fourth unidirectional signal the amplitude of which varies in accordance with the amplitude of the difference of said second and third electrical signals corresponding to the difference in said no-load and load power input respectively to said motor, whereby an indication of the engagement of said tool with said workpiece is obtained.

6. The combination of claim 5 in which said amplifier includes a capacitance of high internal impedance connected between the output and input circuits of said amplifier, and said amplifier also includes a high input impedance whereby said capacitance retains electrical charge over a long period of time and provides a constant unidirectional electrical output corresponding to no-load power input to said motor when said first signal is disconnected from said amplifier.

7. The combination of claim 5 in which said electric motor is an induction motor.